US012675765B2

(12) United States Patent
Kuhara et al.

(10) Patent No.: US 12,675,765 B2
(45) Date of Patent: Jul. 7, 2026

(54) DELIVERY ROUTE INFORMATION OUTPUT METHOD, INFORMATION OUTPUT APPARATUS, AND RECORDING MEDIUM

(71) Applicant: Panasonic Intellectual Property Management Co., Ltd., Osaka (JP)

(72) Inventors: Shunsuke Kuhara, Osaka (JP); Beier Hu, Hainan (CN)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 268 days.

(21) Appl. No.: 18/514,201

(22) Filed: Nov. 20, 2023

(65) Prior Publication Data

US 2024/0086831 A1     Mar. 14, 2024

Related U.S. Application Data

(63) Continuation of application No. PCT/JP2022/017287, filed on Apr. 7, 2022.

(30) Foreign Application Priority Data

May 26, 2021     (JP) ................................. 2021-088268

(51) Int. Cl.
*G06Q 10/00* (2026.01)
*G06Q 10/083* (2023.01)
*G06Q 30/0201* (2023.01)

(52) U.S. Cl.
CPC ... *G06Q 10/08355* (2013.01); *G06Q 10/0838* (2013.01); *G06Q 30/0201* (2013.01)

(58) Field of Classification Search
None
See application file for complete search history.

(56) References Cited

U.S. PATENT DOCUMENTS 6,795,823 B1 * 9/2004 Aklepi ................... G06Q 10/08
709/239
8,386,397 B1 * 2/2013 Agarwal .............. G06Q 10/083
705/330

(Continued)

FOREIGN PATENT DOCUMENTS

JP          2019-149116          9/2019

OTHER PUBLICATIONS

International Search Report (ISR) issued on Jul. 12, 2022 in International (PCT) Application No. PCT/JP2022/017287.

(Continued)

*Primary Examiner* — Tonya Joseph
(74) *Attorney, Agent, or Firm* — Wenderoth, Lind & Ponack, L.L.P.

(57) ABSTRACT

An information output method includes: obtaining delivery destination information concerning a delivery destination to which an article is delivered by a moving body; obtaining merchandise history information concerning a sales history of items sold to a user; calculating, based on the merchandise history information, purchase probability information indicating purchase probability that the user will purchase a merchandise item; selecting one or more candidate articles based on the purchase probability information; obtaining supplier information concerning suppliers of the one or more candidate articles; generating, based on the delivery destination information and the supplier information, and evaluating delivery route candidates which are routes along which the article is delivered by the moving body and along which the one or more candidate articles are loaded onto the moving body; and determining one or more of the delivery route candidates having a result of evaluation satisfying a predetermined condition as a delivery route.

17 Claims, 10 Drawing Sheets

Merchandise history information

| User ID | Vehicle ID | Date and time | Address | Name of commodity | Quantity | Kinds of merchandise item |
|---------|-----------|---------------|---------|-------------------|----------|---------------------------|
| C | 11-11 | 2021/01/AA 9:30 | ccccccc | Drink W | 2 | Beverage |
| T | 22-22 | 2021/01/AA 9:40 | tttttt | Storage medium E | 1 | PC peripheral device |
| ⋮ | ⋮ | ⋮ | ⋮ | ⋮ | ⋮ | ⋮ |

(56) References Cited

U.S. PATENT DOCUMENTS

| | | | |
|---|---|---|---|
| 2008/0040233 A1* | 2/2008 | Wildman | G06Q 30/0635 |
| | | | 705/26.81 |
| 2014/0351067 A1* | 11/2014 | Tomcsik | G06Q 50/12 |
| | | | 705/15 |
| 2016/0202074 A1* | 7/2016 | Woodard | G06Q 10/047 |
| | | | 701/465 |
| 2018/0107971 A1* | 4/2018 | Vukin | G06Q 10/087 |
| 2018/0240066 A1 | 8/2018 | Streebin et al. | |
| 2022/0101250 A1* | 3/2022 | Wang | G06Q 10/0838 |
| 2022/0343227 A1* | 10/2022 | Kroswek | G01C 21/3492 |

OTHER PUBLICATIONS

Extended European Search Report issued Aug. 6, 2024 in corresponding European Patent Application No. 22811046.6.

* cited by examiner

FIG. 2

Current delivery information

| User ID | Address | Kinds of article | Date of delivery | Desired time zone |
|---------|---------|------------------|------------------|-------------------|
| A | aaaaaaa | Food product | 2021/01/XX | 9:00~11:00 |
| F | fffffff | Cloth | 2021/01/YY | 9:00~11:00 |
| ... | ... | ... | ... | ... |

FIG. 3

User information

| User ID | Address | Liking | Age group | Sex | ... |
|---------|---------|--------|-----------|--------|-----|
| A | aaaaaaa | Food product | 30s | Male | ... |
| B | bbbbbbb | Book | 40s | Female | ... |
| ... | ... | ... | ... | ... | ... |

FIG. 4

Delivery history information

| User ID | Vehicle ID | Date and time | Address | Kinds of article |
|---------|-----------|---------------|---------|-----------------|
| V | 55-55 | 2021/01/DD 9:10 | vvvvvv | Electronic device |
| Z | 22-22 | 2021/01/DD 9:20 | zzzzzz | Food product |
| ... | ... | ... | ... | ... |

FIG. 5

Merchandise history information

| User ID | Vehicle ID | Date and time | Address | Name of commodity | Quantity | Kinds of merchandise item |
|---------|-----------|---------------|---------|-------------------|----------|---------------------------|
| C | 11-11 | 2021/01/AA 9:30 | cccccc | Drink W | 2 | Beverage |
| T | 22-22 | 2021/01/AA 9:40 | tttttt | Storage medium E | 1 | PC peripheral device |
| ⋮ | ⋮ | ⋮ | ⋮ | ⋮ | ⋮ | ⋮ |

DELIVERY ROUTE INFORMATION OUTPUT METHOD, INFORMATION OUTPUT APPARATUS, AND RECORDING MEDIUM

CROSS REFERENCE TO RELATED APPLICATIONS

This is a continuation application of PCT International Application No. PCT/JP2022/017287 filed on Apr. 7, 2022, designating the United States of America, which is based on and claims priority of Japanese Patent Application No. 2021-088268 filed on May 26, 2021. The entire disclosures of the above-identified applications, including the specifications, drawings and claims are incorporated herein by reference in their entirety.

FIELD

The present disclosure relates to an information output method that outputs a delivery route of a moving body, and the like.

BACKGROUND

Patent Literature (PTL) 1 discloses an approach to generate a delivery plan of a delivery vehicle (moving body) based on the parking place of the delivery vehicle and the delivery time after parking, the delivery plan including a traveling route between parking places, the stop time in each parking place, and the departure time from the parking place.

CITATION LIST

Patent Literature

PTL 1: Japanese Unexamined Patent Application Publication No. 2019-149116

SUMMARY

Technical Problem

Recently, use of vacant spaces of delivery vehicles for product sales has also been examined. Thus, the delivery vehicle need to go to suppliers during delivery in order to restock merchandise items for product sales.

Accordingly, an object of the present disclosure is to provide an information output method and the like that can output a delivery route for a moving body that performs both delivery and product sales.

Solution to Problem

The information output method according to one aspect of the present disclosure is an information output method for use in an information output apparatus, the information output method including: obtaining delivery destination information concerning at least one delivery destination to which an article is delivered by a moving body; obtaining merchandise history information concerning a sales history of items sold to a user living at the at least one delivery destination; calculating purchase probability information based on the merchandise history information, the purchase probability information indicating purchase probability that the user will purchase a merchandise item; selecting one or more candidate articles included in merchandise items that the user may purchase, based on the purchase probability information; obtaining supplier information concerning suppliers of the one or more candidate articles; generating, based on the delivery destination information and the supplier information, delivery route candidates which are routes along which the article is delivered by the moving body and along which the one or more candidate articles are loaded onto the moving body; evaluating each of the delivery route candidates based on at least one of a traveling time taken for the moving body to travel along the delivery route candidate, a traveling distance of the delivery route candidate for the moving body to travel, or the purchase probability information, determining one or more of the delivery route candidates having a result of evaluation satisfying a predetermined condition as a delivery route to be traveled by the moving body; and outputting the delivery route.

The information output apparatus according to one aspect of the present disclosure is an information output apparatus including: a delivery destination information obtainer that obtains delivery destination information concerning at least one delivery destination to which an article is delivered by a moving body; a merchandise history information obtainer that obtains merchandise history information concerning a sales history of items sold to a user living at the at least one delivery destination; a purchase probability calculator that calculates purchase probability information based on the merchandise history information, the purchase probability information indicating purchase probability that the user will purchase a merchandise item; a selector that selects one or more candidate articles included in merchandise items that the user may purchase, based on the purchase probability information; a supplier information obtainer that obtains supplier information concerning suppliers of the one or more candidate articles; a delivery route candidate generator that generates, based on the delivery destination information and the supplier information, delivery route candidates which are routes along which the article is delivered by the moving body and along which the one or more candidate articles are loaded onto the moving body; an evaluator that evaluates each of the delivery route candidates based on at least one of a traveling time taken for the moving body to travel along the delivery route candidate, a traveling distance of the delivery route candidate for the moving body to travel, or the purchase probability information, and determines one or more of the delivery route candidates having a result of evaluation satisfying a predetermined condition as a delivery route to be traveled by the moving body; and an outputter that outputs the delivery route.

The recording medium according to one aspect of the present disclosure is a non-transitory computer-readable recording medium having recorded thereon a program for causing a computer to execute the information output method.

These general or specific aspects may be implemented by a system, an apparatus, a method, an integrated circuit, a computer program, or a non-transitory recording medium such as a computer-readable CD-ROM, or may be implemented by any combination of systems, apparatuses, methods, integrated circuits, computer programs, and recording media.

Advantageous Effects

The present disclosure can provide an information output method and the like that can output a delivery route for a moving body that performs both delivery and product sales.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 2 is a table illustrating one example of current delivery information according to the embodiment.

FIG. 3 is a table illustrating one example of user information according to the embodiment.

FIG. 4 is a table illustrating one example of delivery history information according to the embodiment.

FIG. 5 is a table illustrating one example of merchandise history information according to the embodiment.

Figure 1:
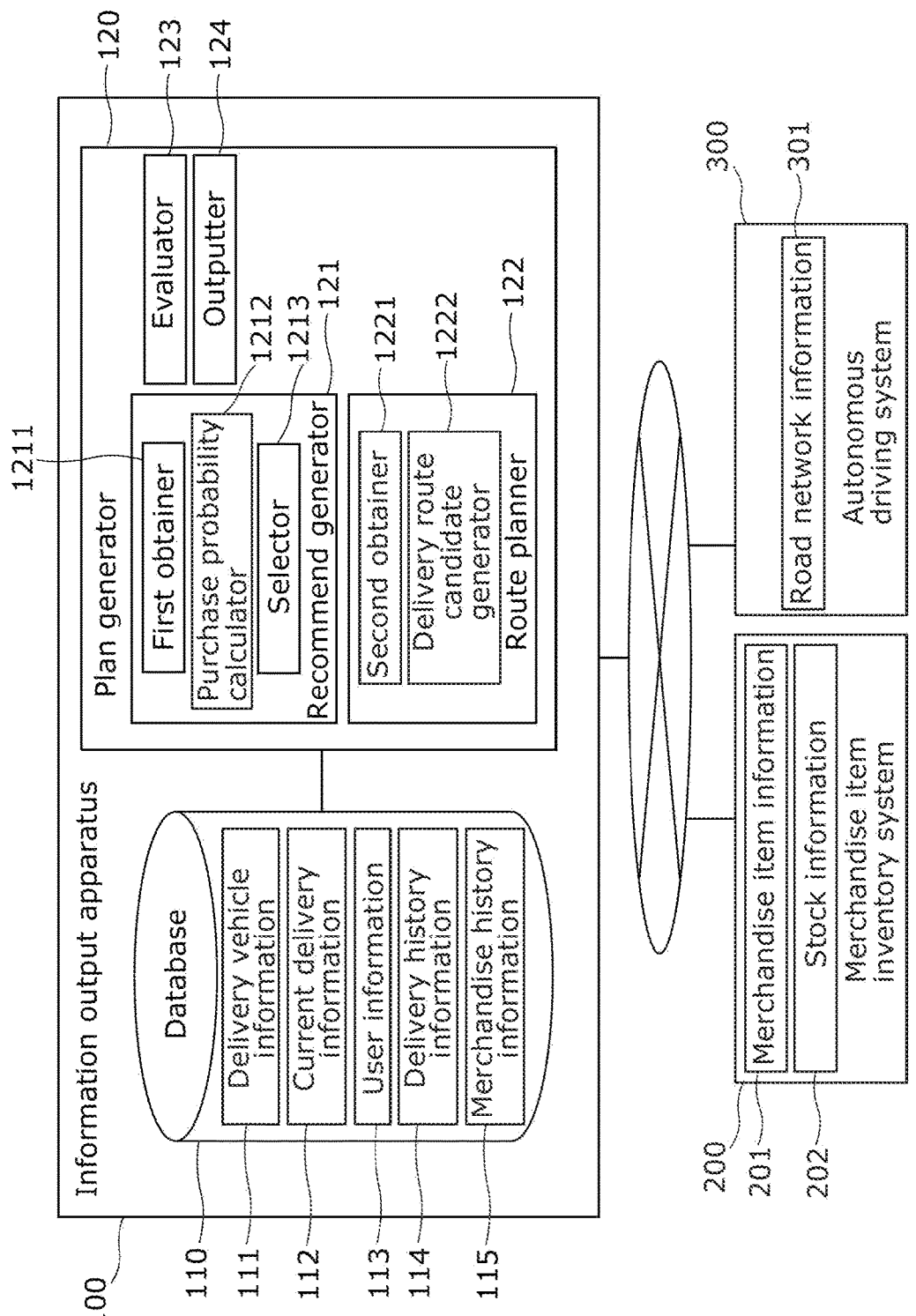
FIG. 1 is a block diagram illustrating the configuration of the information output apparatus according to an embodiment.

DESCRIPTION OF EMBODIMENTS (Underlying Knowledge Forming Basis of the Present Disclosure)

When delivery is performed by a delivery vehicle (moving body), delivery articles are unloaded from the delivery vehicle at its delivery destination(s), which causes a vacant space in the delivery vehicle. To effectively use this vacant space, it is examined that merchandise items for product sales are restocked from the suppliers during delivery to fill the vacant space, and the merchandise items are offered to customers at the delivery destination(s). In this case, because the delivery vehicle goes from the delivery station through one or more delivery destinations and one or more suppliers, and returns to the delivery station, an efficient delivery route need to be created. However, in PTL 1 described above, product sales are not considered, and an efficient delivery route cannot be created in fact.

Thus, the information output method according to the present disclosure is an information output method for use in an information output apparatus, the information output method including: obtaining delivery destination information concerning at least one delivery destination to which an article is delivered by a moving body; obtaining merchandise history information concerning a sales history of items sold to a user living at the at least one delivery destination; calculating purchase probability information based on the merchandise history information, the purchase probability information indicating purchase probability that the user will purchase a merchandise item; selecting one or more candidate articles included in merchandise items that the user may purchase, based on the purchase probability information; obtaining supplier information concerning suppliers of the one or more candidate articles; generating, based on the delivery destination information and the supplier information, delivery route candidates which are routes along which the article is delivered by the moving body and along which the one or more candidate articles are loaded onto the moving body; evaluating each of the delivery route candidates based on at least one of a traveling time taken for the moving body to travel along the delivery route candidate, a traveling distance of the delivery route candidate for the moving body to travel, or the purchase probability information, determining one or more of the delivery route candidates having a result of evaluation satisfying a predetermined condition as a delivery route to be traveled by the moving body; and outputting the delivery route.

Moreover, the information output apparatus according to the present disclosure is an information output apparatus including: a delivery destination information obtainer that obtains delivery destination information concerning at least one delivery destination to which an article is delivered by a moving body; a merchandise history information obtainer that obtains merchandise history information concerning a sales history of items sold to a user living at the at least one delivery destination; a purchase probability calculator that calculates purchase probability information based on the merchandise history information, the purchase probability information indicating purchase probability that the user will purchase a merchandise item; a selector that selects one or more candidate articles included in merchandise items that the user may purchase, based on the purchase probability information; a supplier information obtainer that obtains supplier information concerning suppliers of the one or more candidate articles; a delivery route candidate generator that generates, based on the delivery destination information and the supplier information, delivery route candidates which are routes along which the article is delivered by the moving body and along which the one or more candidate articles are loaded onto the moving body; an evaluator that evaluates each of the delivery route candidates based on at least one of a traveling time taken for the moving body to travel along the delivery route candidate, a traveling distance of the delivery route candidate for the moving body to travel, or the purchase probability information, and determines one or more of the delivery route candidates having a result of evaluation satisfying a predetermined condition as a delivery route to be traveled by the moving body; and an outputter that outputs the delivery route.

Moreover, a recoding medium according to the present disclosure is a non-transitory computer-readable recording medium having recorded thereon a program for causing a computer to execute the information output method.

According to this, because the delivery route candidates are generated based on the supplier information concerning the suppliers of the one or more candidate articles that the user of the delivery destination may purchase and the delivery destination information, the delivery route candidates can be created in consideration of not only the delivery destination but also the supplier. Furthermore, because the delivery route candidates are evaluated based on at least one of the traveling time, the traveling distance, or the purchase probability information and a delivery route candidate having a result of evaluation satisfying the predetermined condition is determined and output as the delivery route, an efficient delivery route is output. Accordingly, an efficient delivery route can be output for the moving body which performs both delivery and product sales.

Moreover, the purchase probability information may be calculated using a model trained based on the merchandise history information, delivery history information concerning a delivery history of the user living at the at least one delivery destination, and user information concerning the user.

According to this, because the purchase probability information is calculated using the model retrained based on the merchandise history information, the delivery history information concerning the delivery history of the user living at the at least one delivery destination, and the user information concerning the user, the purchase probability information can be calculated using the model in consideration of the merchandise history information, the delivery history information, and the user information. Because this can increase the accuracy of the purchase probability information, one or more candidate articles having high purchase probabilities can be selected, and more appropriate supplier information can be obtained. Accordingly, the accuracy in generation of the delivery route candidates can be increased, resulting in a more efficient delivery route.

Moreover, the model may be retrained when a predetermined update condition is satisfied.

According to this, because the model is retrained when the predetermined update condition is satisfied, the model can be updated to be suitable for the situation. Accordingly, the accuracy of the purchase probability information can be further increased.

Moreover, in the information output method, users living at delivery destinations are formed into groups, and the one or more candidate articles are selected for each of the groups based on the purchase probability information calculated for the corresponding one of the groups, the delivery destinations being the at least one delivery destination.

According to this, because the users living at the delivery destinations are formed into groups and the one or more candidate articles are selected for each of the groups based on the purchase probability information calculated for the corresponding one of the groups, one or more candidate articles having higher purchase probabilities can be selected.

Moreover, in the information output method, in the selecting of the one or more candidate articles, one or more candidate articles included in a predetermined number of top-ranking positions of the purchase probability indicated in the purchase probability information may be selected among a plurality of candidate articles.

According to this, because the one or more candidate articles included in the predetermined number of top-ranking positions of purchase probability indicated in the purchase probability information are selected among the plurality of candidate articles, the one or more candidate articles having higher purchase probabilities can be selected.

Moreover, in the information output method, in the evaluating of each of the delivery route candidates, a delivery route candidate having a higher purchase probability may be ranked in a higher position, the purchase probability being included in the purchase probability information.

According to this, because the delivery route candidate having a higher purchase probability included in the purchase probability information is ranked in a higher position, it is more likely to determine, as the delivery route, the delivery route candidate on which the one or more candidate articles are more likely to be purchased by the user.

Moreover, in the information output method, in the evaluating of each of the delivery route candidates, a delivery route candidate having a shorter traveling time may be ranked in a higher position.

According to this, because a delivery route candidate having a shorter traveling time is ranked in a higher position, it is more likely to determine the delivery route candidate with a shorter traveling time as the delivery route.

Moreover, in the information output method, in the evaluating of each of the delivery route candidates, a delivery route candidate having a shorter traveling distance may be ranked in a higher position.

According to this, because a delivery route candidate having a shorter traveling distance is ranked in a higher position, it is more likely to determine the delivery route candidate with a shorter traveling distance as the delivery route.

Moreover, the one or more candidate articles may include a proposed article proposed by an article vendor based on user information of the user.

According to this, because the proposed article proposed by the article vendor is included in the one or more candidate articles, the article vendor can make the user aware of the proposed article and sell it.

Moreover, in the information output method, information promoting purchase of the one or more candidate articles loaded onto the moving body may be output.

According to this, because the information promoting purchase of the one or more candidate articles loaded onto the moving body is output, user's appetite for purchase can be increased.

Moreover, in the information output method, when a delivery destination of one moving body and a delivery destination of an other moving body are a same delivery destination, a delivery route of the one moving body and a delivery route of the other moving body may be updated to cause only the one moving body to travel to the same delivery destination, the same delivery destination being included in the at least one delivery destination.

According to this, when the delivery destination of the one moving body and that of the other moving body are the same delivery destination, the delivery route of the one moving body and the delivery route of the other moving body are updated to cause only the one moving body to travel to the same delivery destination. For this reason, it can be configured that the one moving body collectively delivers to the same delivery destination while the other moving body does not deliver there. Accordingly, the delivery routes of a plurality of moving bodies can be made more efficient.

Moreover, in the information output method, when a supplier of one moving body and a supplier of an other moving body are a same supplier, a delivery route of the one moving body and a delivery route of the other moving body may be updated to cause only the one moving body to travel to the same supplier and briefly meet the other moving body after traveling to the same supplier, the same supplier being included in the suppliers.

According to this, when the supplier of the one moving body and that of the other moving body are the same supplier, the delivery route of the one moving body and that of the other moving body are updated, and only the one moving body is caused to travel to the same supplier and briefly meet the other moving body after traveling to the same supplier. For this reason, after the one moving body collectively restocks candidate articles from the same supplier, the one moving body can pass the candidate articles to the other moving body at the meeting place. Accordingly, the delivery routes of a plurality of moving bodies can be made more efficient.

Moreover, the information output method may include: obtaining change information including a change in situation in the delivery route; and updating the delivery route based on the change information.

According to this, because the delivery route is updated based on the change information when the situation changes on the delivery route, a delivery route suitable for the change in situation can be created.

The information output method may include: obtaining space information concerning a situation of a vacant space of the moving body; and updating the one or more candidate articles and the delivery route based on the space information.

According to this, because the one or more candidate articles and the delivery route are updated according to the situation of the vacant space of the moving body, the one or more candidate articles and the delivery route suitable for the situation of the vacant space at that time can be created.

The information output method may include: obtaining space availability information concerning space availability in a plurality of moving bodies for the one or more candidate articles, the plurality of moving bodies each being the moving body; and adjusting a space for the one or more candidate articles of each of the plurality of moving bodies based on the space availability information of the moving body.

According to this, because the space for the one or more candidate articles in each of the plurality of moving bodies is adjusted based on the space availability information of the moving body, the one or more candidate articles can be loaded in an amount according to the space availability.

Furthermore, these general or specific aspects may be implemented by a system, an apparatus, a method, an integrated circuit, a computer program, or a non-transitory recording medium such as a computer-readable CD-ROM, or may be implemented by any combination of systems, apparatuses methods, integrated circuits, computer programs, and recording media.

EMBODIMENTS

Hereinafter, embodiments will be specifically described with reference to the drawings. The embodiments described below all illustrate general or specific examples. Numeric values, shapes, materials, components, arrangement positions of components, connection forms thereof, steps, order of steps, and the like shown in the embodiments below are exemplary, and are not intended to limit the scope of CLAIMS. Moreover, among the components of the embodiments below, the components not described in an independent claim will be described as optional components.

Embodiment 1

(Information Output Apparatus)

Information output apparatus 100 according to the present disclosure is an apparatus for managing delivery by a plurality of autonomous driving vehicles as one example of the moving body when the autonomous driving vehicles deliver articles to residences of users. Furthermore, information output apparatus 100 is also an apparatus for managing product sales to the users in addition to the delivery. In other words, information output apparatus 100 has functions to plan and output an efficient delivery route for delivery and product sales performed by each of the autonomous driving vehicles.

FIG. 1 is a block diagram illustrating the configuration of information output apparatus 100 according to an embodiment. As illustrated in FIG. 1, information output apparatus 100 is communicably connected via the Internet to external systems such as merchandise item inventory system 200 and autonomous driving system 300.

Here, merchandise item inventory system 200 is a system for managing a plurality of merchandise items (commodities) which may be sold. Merchandise item inventory system 200 has merchandise item information 201 and stock information 202. Merchandise item information 201 includes addresses (positional information) and contacts of suppliers of merchandise items. Because the merchandise items include candidate articles which the users may purchase, it can be said that this merchandise item information 201 is one example of supplier information concerning the suppliers of one or more candidate articles. Stock information 202 includes the quantity of each merchandise item in stock in each supplier.

Autonomous driving system 300 has road network information 301 within delivery areas of the autonomous driving vehicles. Road network information 301 includes a variety of pieces of information needed for autonomous driving, such as map information (including road maps and house maps), traffic rule information, traffic restriction information, and traffic jam information within the delivery areas.

Information output apparatus 100 includes database 110 and plan generator 120. Database 110 is a memory device such as an HDD or an SSD, and has information used in planning of the delivery route. Specifically, database 110 has delivery vehicle information 111, current delivery information 112, user information 113, delivery history information 114, and merchandise history information 115.

Delivery vehicle information 111 includes identification information (vehicle ID) of the autonomous driving vehicle used in delivery.

Current delivery information 112 is information of a collection of deliveries to substantially the same delivery area among all the deliveries in a predetermined period (such as morning, afternoon, or day). FIG. 2 is a table illustrating one example of current delivery information 112 according to the embodiment. As illustrated in FIG. 2, current delivery information 112 includes a user ID which is identification information of the user, the address, the kinds of article to be delivered, the date of delivery, and the desired time zone. Current delivery information 112 is one example of delivery destination information concerning the delivery destination.

User information 113 includes information concerning users living at delivery destinations. In other words, user information 113 is one example of the delivery destination information. FIG. 3 is a table illustrating one example of user information 113 according to the embodiment. As illustrated in FIG. 3, user information 113 includes the user ID, the address, the liking, the age group, and the sex. The liking is registered by answering a questionnaire by the user, for example. User information 113 may include other information which can be used when the user selects one or more candidate articles included in merchandise items which the user may purchase.

Delivery history information 114 includes information in the deliveries to the users in the past. FIG. 4 is a table illustrating one example of delivery history information 114 according to the embodiment. As illustrated in FIG. 4, delivery history information 114 collectively includes the user ID, the vehicle ID, the date and time, the address, and the kinds of article for each delivery.

Merchandise history information 115 is information concerning sales history for each user. FIG. 5 is a table illustrating one example of merchandise history information 115 according to the embodiment. As illustrated in FIG. 5, merchandise history information 115 includes the user ID, the vehicle ID, the date and time, the address, the name of the commodity as the merchandise item, the quantity of the merchandise item, and the kind of merchandise item. Merchandise history information 115 may include other information which can be used in selection of the one or more candidate articles.

As illustrated in FIG. 1, database 110 obtains pieces of information which are input from an input device not illustrated. The input device may be a keyboard, a mouse, or a touch panel connected to information output apparatus 100, or may be a computer connected to information output apparatus 100 via the Internet. In database 110, the obtained pieces of information are classified into delivery vehicle information 111, current delivery information 112, user information 113, delivery history information 114, and merchandise history information 115, and are stored.

Plan generator 120 includes a CPU, a RAM, and a ROM, and the CPU develops a program stored in the ROM to the RAM, and executes the program. Specifically, plan generator 120 includes recommend generator 121, route planner 122, evaluator 123, and outputter 124.

Recommend generator 121 generates one or more candidate articles that are merchandise items that the user living at the delivery destination may purchase. Specifically, recommend generator 121 includes first obtainer 1211, purchase probability calculator 1212, and selector 1213.

First obtainer 1211 obtains merchandise history information 115, delivery history information 114, user information 113, and current delivery information 112 from database 110, and obtains merchandise item information 201 and stock information 202 from merchandise item inventory system 200. In other words, first obtainer 1211 is one example of the merchandise history information obtainer that obtains the merchandise history information.

Purchase probability calculator 1212 calculates purchase probability information based on merchandise history information 115, the purchase probability information indicating purchase probability that the user will purchase the merchandise item. Specifically, purchase probability calculator 1212 creates a model trained based on merchandise history information 115, delivery history information 114, and user information 113, and calculates the purchase probability using the model. Here, the model is an inference model for performing inference processing, such as a neural network model. Alternatively, for example, the model may be a mathematical model for performing inference processing, may be a machine learning model, or may be a deep learning model.

Because such a model is created, the purchase probability according to merchandise history information 115, delivery history information 114, and user information 113 can be calculated for each merchandise item. For example, because merchandise history information 115 includes the names of commodities as the merchandise items purchased by the user in the past, the kinds thereof, and the quantities thereof, the purchase probability can be calculated in consideration of this purchase tendency. Because delivery history information 114 includes the kinds of articles delivered to the user in the past and the date and time thereof, the purchase probability can be calculated in consideration of this delivery tendency. Because user information 113 includes the liking of the user, the purchase probability can be purchased in consideration of this liking.

Purchase probability calculator 1212 calculates the purchase probability information of each merchandise item for each user by applying current delivery information 112 and merchandise item information 201 to the model. Based on the result of calculation, purchase probability calculator 1212 creates a list of merchandise items for each user, the merchandise items being included in a predetermined number of top-ranking positions of purchase probability indicated in the purchase probability information. Here, the merchandise items included in the predetermined number of top-ranking positions indicate the merchandise items included in those having purchase probabilities in the range of the highest purchase probability to the N-th purchase probability.

Purchase probability calculator 1212 retrains the model when a predetermined update condition is satisfied. The predetermined update condition includes a plurality of update conditions, and purchase probability calculator 1212 retrains the model when at least one of these update conditions is satisfied. Examples of the plurality of update conditions include the case where a predetermined time has passed from the previous creation of the model, the case where the purchase probability (described later) at this time changes from the previous one in an amount larger than or equal to a predetermined amount, the case where kinds of merchandise items included in merchandise item information 201 increase or decrease, and the case where the users included in user information 113 increase or decrease.

Selector 1213 selects one or more candidate articles included in merchandise items which the user may purchase, based on the purchase probability information calculated by purchase probability calculator 1212. Specifically, first, selector 1213 forms the users into groups. Selector 1213 compares lists of users, and classifies the users into the same group when the degree of overlapping of the same merchandise items included the lists is higher than a predetermined proportion.

In the next step, selector 1213 calculates the purchase probabilities of the same merchandise items for each group, and creates a merchandise item candidate list in which the merchandise items are arranged in the descending order of purchase probability. Although the merchandise item candidate list is created for each of the groups, the description below will be made using only an exemplary merchandise item candidate list of one group. The same processing is performed on the merchandise item candidate lists of other groups.

Selector 1213 extracts the merchandise items currently in stock by checking the merchandise items included in the merchandise item candidate list against stock information 202 obtained by first obtainer 1211. Selector 1213 arranges the extracted merchandise items in the descending order of purchase probability to create an in-stock candidate list. The merchandise items included in the in-stock candidate list are candidate articles for the users included in one group.

Route planner 122 plans delivery route candidates including delivery and product sales. Route planner 122 includes second obtainer 1221 and delivery route candidate generator 1222.

Second obtainer 1221 obtains current delivery information 112 as one example of the delivery destination information from database 110, and obtains merchandise item information 201 as one example of the supplier information from merchandise item inventory system 200. In other words, second obtainer 1221 is one example of the delivery destination information obtainer that obtains the delivery destination information and the supplier information obtainer that obtains the supplier information. Second obtainer 1221 also obtains road network information 301 from autonomous driving system 300.

Based on current delivery information 112 and merchandise item information 201, delivery route candidate generator 1222 generates delivery route candidates which are routes along which the article is delivered by an autonomous driving vehicle and along which the one or more candidate articles are loaded onto the autonomous driving vehicle. Specifically, delivery route candidate generator 1222 obtains the addresses of the suppliers of the one or more candidate articles included in the in-stock candidate list by checking the in-stock candidate list against merchandise item information 201. Delivery route candidate generator 1222 obtains the addresses of the users that are delivery destinations, from current delivery information 112. Delivery route candidate generator 1222 associates the addresses of the suppliers of the one or more candidate articles and the addresses of the users that are the delivery destinations, with road network information 301. In the next step, delivery route candidate generator 1222 creates delivery route candidates that can circuit the delivery station, the delivery destinations, and the suppliers on road network information 301. At this time, delivery route candidate generator 1222 may create a plurality of delivery route candidates to cover all the roads included in road network information 301, or may create a plurality of delivery route candidates located at a distance less than a predetermined distance. Because the delivery station may also function as a supplier, it can also be said that this case is one example of the supplier.

Evaluator 123 evaluates the delivery route candidates generated by delivery route candidate generator 1222, and determines the delivery route having the highest result of evaluation as the delivery route to be actually traveled by the autonomous driving vehicle. Specifically, evaluator 123 evaluates each of the delivery route candidates based on at least one of the traveling time taken for the autonomous driving vehicle to travel along the delivery route candidate, the traveling distance for the autonomous driving vehicle to travel the delivery route candidate, or the purchase probability information. For example, evaluator 123 ranks each of the delivery route candidates in a higher position as the candidate articles that can be restocked from the supplier included in the delivery route candidate have higher purchase probabilities (first criterion for evaluation). Evaluator 123 ranks each of the delivery route candidates in a higher position as the delivery route candidate has a shorter traveling time (second criterion for evaluation). In this case, evaluator 123 may obtain (calculate) the traveling time in consideration of the traffic rule information, the traffic restriction information, and the traffic jam information included in road network information 301. Evaluator 123 ranks each of the delivery route candidates in a higher position as the delivery route candidate has a shorter traveling distance (third criterion for evaluation).

Criteria for evaluation other than the first criterion for evaluation, the second criterion for evaluation, and the third criterion for evaluation may be used. One of other criteria for evaluation is a criterion for evaluation to rank the delivery route candidate in a higher position as the autonomous driving vehicle has a smaller vacant space. When the autonomous driving vehicle performs only delivery, the vacant space becomes larger as delivery of the autonomous driving vehicle is advancing from the delivery station. In other words, in a delivery route candidate going to the supplier immediately after the delivery is finished, the vacant space can be used to load candidate articles, thus decreasing the vacant space. When the candidate articles are sold at the delivery destination, the vacant space is increased by the amount of sales. In this case, in a delivery route candidate going to the supplier immediately after the delivery destination which is the residence of the user with high purchase probabilities of the candidate articles loaded onto the autonomous driving vehicle, the resulting vacant space can be used to newly load candidate articles, thus decreasing the vacant space. Thus, the criterion for evaluation to rank the delivery route candidate in a higher position as the autonomous driving vehicle has a smaller vacant space is suitable because the vacant space can be decreased.

Although evaluator 123 evaluates each of the delivery route candidates using at least one of these criteria for evaluation, more suitable evaluation can be performed when a plurality of criteria for evaluation are used in a composite manner. When a plurality of criteria for evaluation are used, the weights of the results of evaluation according to the criteria for evaluation may be adjusted depending on the importance of each criterion for evaluation. Among the results of evaluation of the delivery route candidates, evaluator 123 determines a delivery route candidate satisfying the predetermined condition as the delivery route to be actually traveled by the autonomous driving vehicle. Although the case where the predetermined condition is the highest result of evaluation has been illustrated in the present embodiment, any other condition may be used.

Outputter 124 is a communication module which outputs the delivery route determined by evaluator 123 to an external apparatus via the Internet. For example, outputter 124 outputs the delivery route to the autonomous driving vehicle via the Internet. Thereby, the autonomous driving vehicle performs delivery and product sales based on the delivery route.

Together with the delivery route determined by evaluator 123, outputter 124 may output information promoting purchase of candidate articles by the user to the autonomous driving vehicle. Because a notifier (a display unit or a voice output device) included in the autonomous driving vehicle issues the information promoting purchase of candidate articles, user's appetite for purchasing candidate articles can be increased.

(Information Output Method)

Next, the information output method in the information output apparatus 100 will be described. The information output method is implemented by the CPU in plan generator 120 executing a program stored in the ROM. The information output method includes a method of selecting one or more candidate articles and a method of determining a delivery route.

Figure 6:
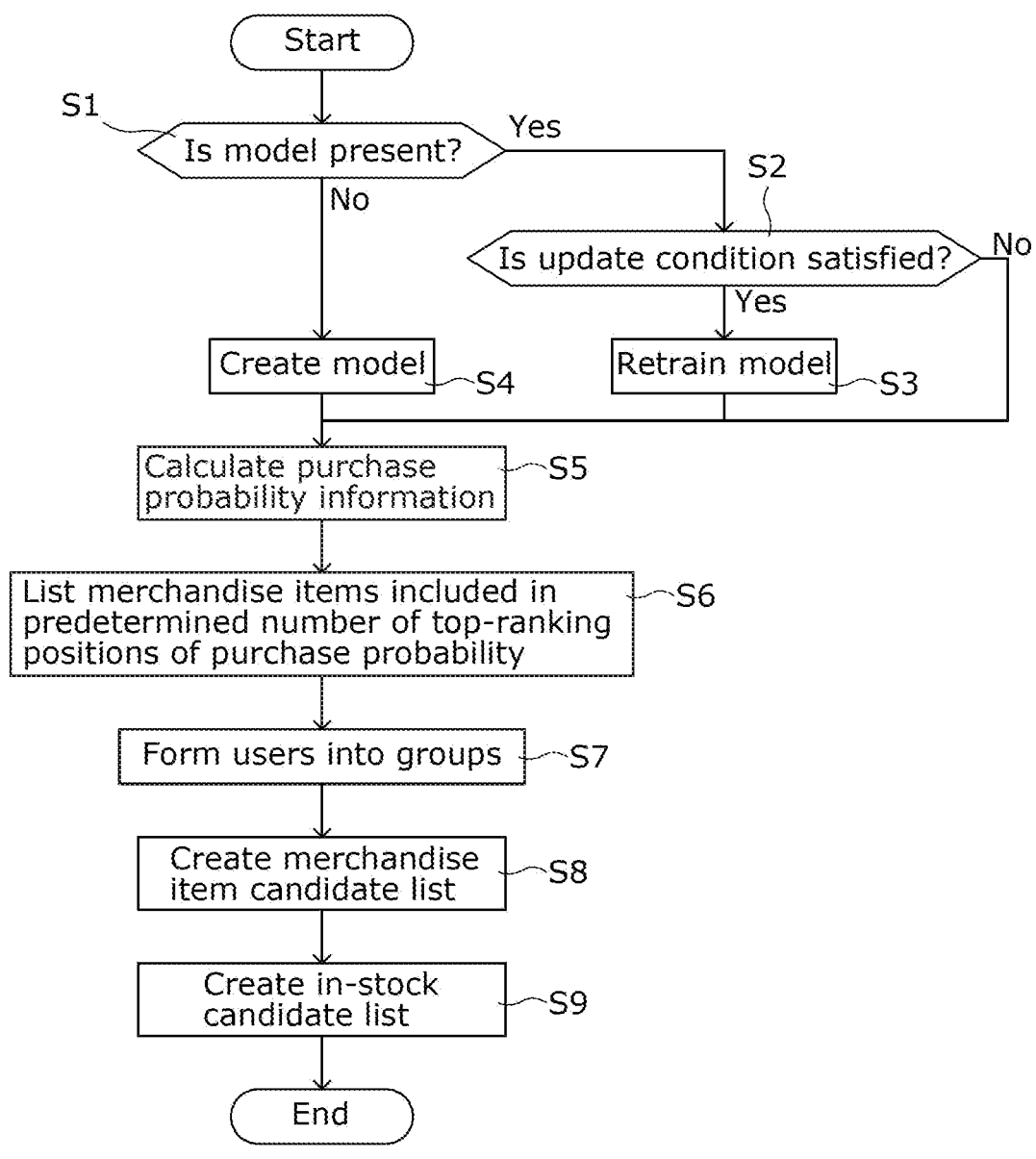
FIG. 6 is a flowchart illustrating the flow of the method of selecting one or more candidate articles according to the embodiment.

Initially, the method of selecting one or more candidate articles will be described. FIG. 6 is a flowchart illustrating the flow of the method of selecting one or more candidate articles according to the embodiment. Although it is assumed that in the method of selecting one or more candidate articles herein, first obtainer 1211 has already obtained merchandise history information 115, delivery history information 114, user information 113, current delivery information 112, merchandise item information 201, and stock information 202, first obtainer 1211 may obtain these pieces of information when needed.

As illustrated in FIG. 6, in step S1, purchase probability calculator 1212 determines whether the model is present. When the model is already created, the processing goes to step S2. When the model is not present, the processing goes to step S4.

In step S2, purchase probability calculator 1212 determines whether the predetermined update condition is satisfied. When the predetermined update condition is satisfied, the processing goes to step S3. When the predetermined update condition is not satisfied, the processing goes to step S5.

In step S3, purchase probability calculator 1212 retrains the existing model based on merchandise history information 115, delivery history information 114, and user information 113.

In step S4, purchase probability calculator 1212 creates the model trained based on merchandise history information 115, delivery history information 114, and user information 113.

In step S5, purchase probability calculator 1212 calculates purchase probability information of each merchandise item for each user by applying current delivery information 112 and merchandise item information 201 to the model.

In step S6, purchase probability calculator 1212 creates a list of merchandise items for each user, the merchandise items being included in a predetermined number of top-ranking positions of purchase probability indicated in the purchase probability information.

In step S7, selector 1213 compares lists L1 to Ln (where n is the total number of users) of the users, and classifies the users into the same group when the degree of overlapping of the same merchandise items included in lists L1 to Ln is higher than a predetermined proportion.

In step S8, selector 1213 calculates the purchase probabilities of the same merchandise items for each of the groups, and creates merchandise item candidate lists C1 to Cm (where m is the total number of groups) in which the merchandise items are arranged in the descending order of purchase probability.

In step S9, selector 1213 extracts the merchandise items currently in stock by checking the merchandise items included in merchandise item candidate lists C1 to Cm against stock information 202 obtained by first obtainer 1211. Selector 1213 arranges the extracted merchandise items in the descending order of purchase probability to create in-stock candidate lists Q1 to Qm. The merchandise items included in each of in-stock candidate lists Q1 to Qm are candidate articles for the users included in the corresponding one of the groups.

Figure 7:
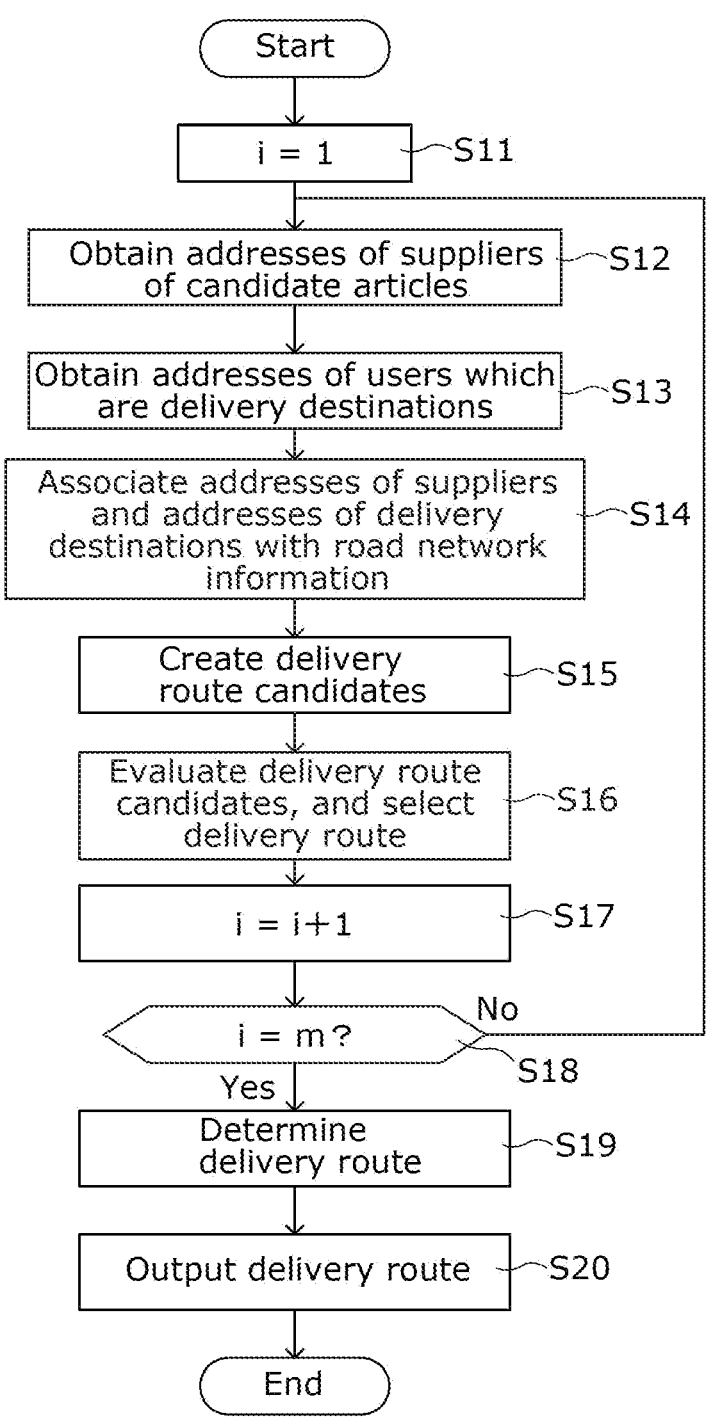
FIG. 7 is a flowchart illustrating the flow of the method of determining a delivery route according to the embodiment.

Next, the method of determining a delivery route will be described. FIG. 7 is a flowchart illustrating the flow of the method of determining a delivery route according to the embodiment. Although it is assumed that in the method of determining a delivery route herein, second obtainer 1221 has already obtained current delivery information 112 and merchandise item information 201, second obtainer 1221 may obtain these pieces of information when needed.

As illustrated in FIG. 7, in step S11, delivery route candidate generator 1222 sets i to 1.

In step S12, delivery route candidate generator 1222 obtains the addresses of the suppliers of the one or more candidate articles included in in-stock candidate list Qi by checking in-stock candidate list Qi of group Gi against merchandise item information 201.

In step S13, delivery route candidate generator 1222 obtains the addresses of the users that are delivery destinations, from current delivery information 112.

In step S14, delivery route candidate generator 1222 associates the addresses of the suppliers of the one or more candidate articles and the addresses of the users that are delivery destinations, with road network information 301.

In step S15, delivery route candidate generator 1222 creates delivery route candidates that can circuit the delivery station, the delivery destinations, and the suppliers on road network information 301.

Figure 8:
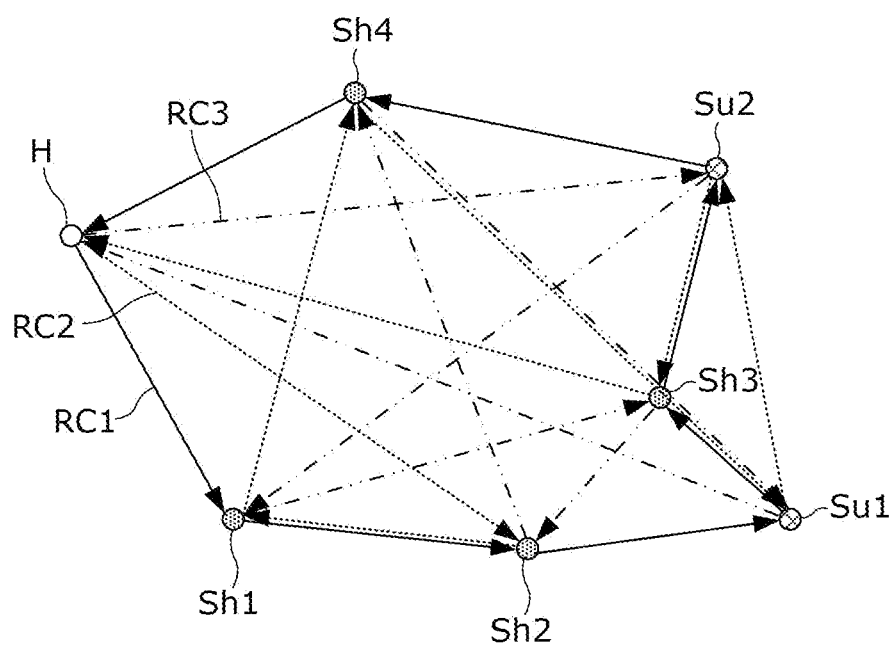
FIG. 8 is a schematic view illustrating a plurality of delivery route candidates according to the embodiment.

FIG. 8 is a schematic view illustrating a plurality of delivery route candidates according to the embodiment. In FIG. 8, all of delivery route candidates RC1 to RC3 are routes starting from delivery station H, circuiting delivery destinations Sh1 to Sh4 and suppliers Su1 and Su2, and returning to delivery station H. Delivery route candidates RC1 to RC3 are represented by different lines. Although FIG. 8 illustrates the case where points of places (delivery station H, delivery destinations Sh1 to Sh4, suppliers Su1 and Su2) are connected with straight lines in each of delivery route candidates RC1 to RC3, a plurality of routes connecting between adjacent points of places are generated according to the roads between the points of places. Although FIG. 8 illustrates the case where three delivery route candidates are present, actually, a plurality of delivery route candidates are generated to cover all the roads included in road network information 301.

As illustrated in FIG. 7, in step S16, evaluator 123 evaluates a plurality of delivery route candidates generated by delivery route candidate generator 1222, and selects that having the highest result of evaluation as delivery route R1 with respect to group Gi.

In step S17, delivery route candidate generator 1222 adds 1 to i.

In step S18, delivery route candidate generator 1222 determines whether i is equal to m. When i is not equal to m, the processing goes to step S12. When i is equal to m, the processing goes to step S19. Thereby, delivery routes R1 to Rm with respect to all of groups G1 to Gm are selected.

In step S19, among delivery routes R1 to Rm, evaluator 123 determines that having the highest result of evaluation as the delivery route to be actually traveled by the autonomous driving vehicle.

In step S20, outputter 124 outputs the delivery route determined by evaluator 123 to the autonomous driving vehicle via the Internet.

(Effects)

As described above, the information output method according to the present disclosure includes obtaining delivery destination information (current delivery information 112) concerning at least one delivery destination to which an article is delivered by a moving body (autonomous driving vehicle); obtaining merchandise history information 115 concerning a sales history of items sold to a user living at the at least one delivery destination; calculating purchase probability information based on merchandise history information 115, the purchase probability information indicating purchase probability that the user will purchase a merchandise item; selecting one or more candidate articles included in merchandise items which the user may purchase, based on the purchase probability information; obtaining supplier information (merchandise item information 201) concerning suppliers of the one or more candidate articles; generating, based on the delivery destination information and the supplier information, delivery route candidates which are routes along which the article is delivered by the moving body and along which the one or more candidate articles are loaded onto the moving body; evaluating each of the delivery route candidates based on at least one of a traveling time taken for the moving body to travel along the delivery route candidate, a traveling distance of the delivery route candidate for the moving body to travel, or the purchase probability information, determining one or more of the delivery route candidates having a result of evaluation satisfying a predetermined condition as a delivery route to be traveled by the moving body; and outputting the delivery route.

Information output apparatus 100 according to the present disclosure includes delivery destination information obtainer (second obtainer 1221) that obtains delivery destination information (current delivery information 112) concerning at least one delivery destination to which an article is delivered by a moving body (autonomous driving vehicle); merchandise history information obtainer (first obtainer 1211) that obtains merchandise history information 115 concerning a sales history of items sold to a user living at the at least one delivery destination; purchase probability calculator 1212 which calculates purchase probability information based on merchandise history information 115, the purchase probability information indicating purchase probability that the user will purchase a merchandise item; selector 1213 that selects one or more candidate articles included in merchandise items that the user may purchase, based on the purchase probability information; supplier information obtainer (second obtainer 1221) that obtains supplier information concerning suppliers of the one or more candidate articles; delivery route candidate generator 1222 that generates, based on the delivery destination information and the supplier information, delivery route candidates which are routes along which the article is delivered by the moving body and along which the one or more candidate articles are loaded onto the moving body; and evaluator 123 that evaluates the delivery route candidates based on at least one of a traveling time taken for the moving body to travel along the delivery route candidate, a traveling distance of the delivery route candidate for the moving body to travel, or the purchase probability information, and determines one or more of the delivery route candidates having a result of evaluation satisfying a predetermined condition as a delivery route to be traveled by the moving body; and outputter 124 that outputs the delivery route.

The recording medium according to the present disclosure is a non-transitory computer-readable recording medium having recorded thereon a program for causing a computer to execute the information output method described above.

According to this, because the delivery route candidates are generated based on the supplier information concerning the suppliers of the one or more candidate articles that the user at the delivery destination may purchase and the delivery destination information, the delivery route candidates can be created in consideration of not only the delivery destination but also the supplier. Furthermore, because the delivery route candidates are evaluated based on at least one of the traveling time, the traveling distance, or the purchase probability information and a delivery route candidate having a result of evaluation satisfying the predetermined condition is determined and output as the delivery route, an efficient delivery route is output. Accordingly, an efficient delivery route for the moving body which performs both delivery and product sales can be output.

The purchase probability information is calculated using a model trained based on merchandise history information 115, delivery history information 114 concerning a delivery history of the user living at the at least one delivery destination, and user information 113 concerning the user.

According to this, because the purchase probability information is calculated using a model trained based on merchandise history information 115, delivery history information 114, and user information 113, the purchase probability information can be calculated using the model in consideration of merchandise history information 115, delivery history information 114, and user information 113. Because this can increase the accuracy of the purchase probability information, one or more candidate articles having high purchase probabilities can be selected, and more suitable supplier information can be obtained. Accordingly, the delivery route candidates can be generated with increased accuracy, and as a result, a more efficient delivery route can be determined.

The model is retrained when a predetermined update condition is satisfied.

According to this, because the model is retrained when the predetermined update condition is satisfied, the model can be updated to be suitable for the situation at that time. Accordingly, the accuracy of the purchase probability information can be further increased.

Users living at delivery destinations are formed into groups, and the one or more candidate articles are selected for each of the groups based on the purchase probability information calculated for the corresponding one of the groups, the delivery destinations being the at least one delivery destination.

According to this, because the users living at the delivery destinations are formed into groups and the one or more candidate articles are selected for each of the group based on the purchase probability information calculated for the corresponding one of the groups, the one or more candidate articles having higher purchase probabilities can be selected.

In the selecting of the one or more candidate articles, one or more candidate articles included in a predetermined number of top-ranking positions of purchase probability indicated in the purchase probability information are selected among a plurality of candidate articles.

According to this, because one or more candidate articles included in a predetermined number of top-ranking positions of purchase probability indicated in the purchase probability information are selected among the plurality of candidate articles, the one or more candidate articles having higher purchase probabilities can be selected.

In the evaluating of each of the delivery route candidates, a delivery route candidate having a higher purchase probability is ranked in a higher position, the purchase probability being included in the purchase probability information.

According to this, because the delivery route candidate having higher purchase probability included in the purchase probability information is ranked in a higher position, it is more likely to determine, as the delivery route, the delivery route candidate on which the one or more candidate articles are more likely to be purchased by the user.

In the evaluating of each of the delivery route candidates, a delivery route candidate having a shorter traveling time is ranked in a higher position.

According to this, because a delivery route candidate having a shorter traveling time is ranked in a higher position, it is more likely to determine the delivery route candidate having a shorter traveling time as the delivery route.

In the evaluating of each of the delivery route candidates, a delivery route candidate having a shorter traveling distance is ranked in a higher position.

According to this, because a delivery route candidate having a shorter traveling distance is ranked in a higher position, it is more likely to determine the delivery route candidate having a shorter traveling distance as the delivery route.

Moreover, information promoting purchase of the one or more candidate articles loaded onto the moving body is output.

According to this, because the information promoting purchase of the one or more candidate articles loaded onto the moving body is output, user's appetite for purchase can be increased.

Embodiment 2

Figure 9:
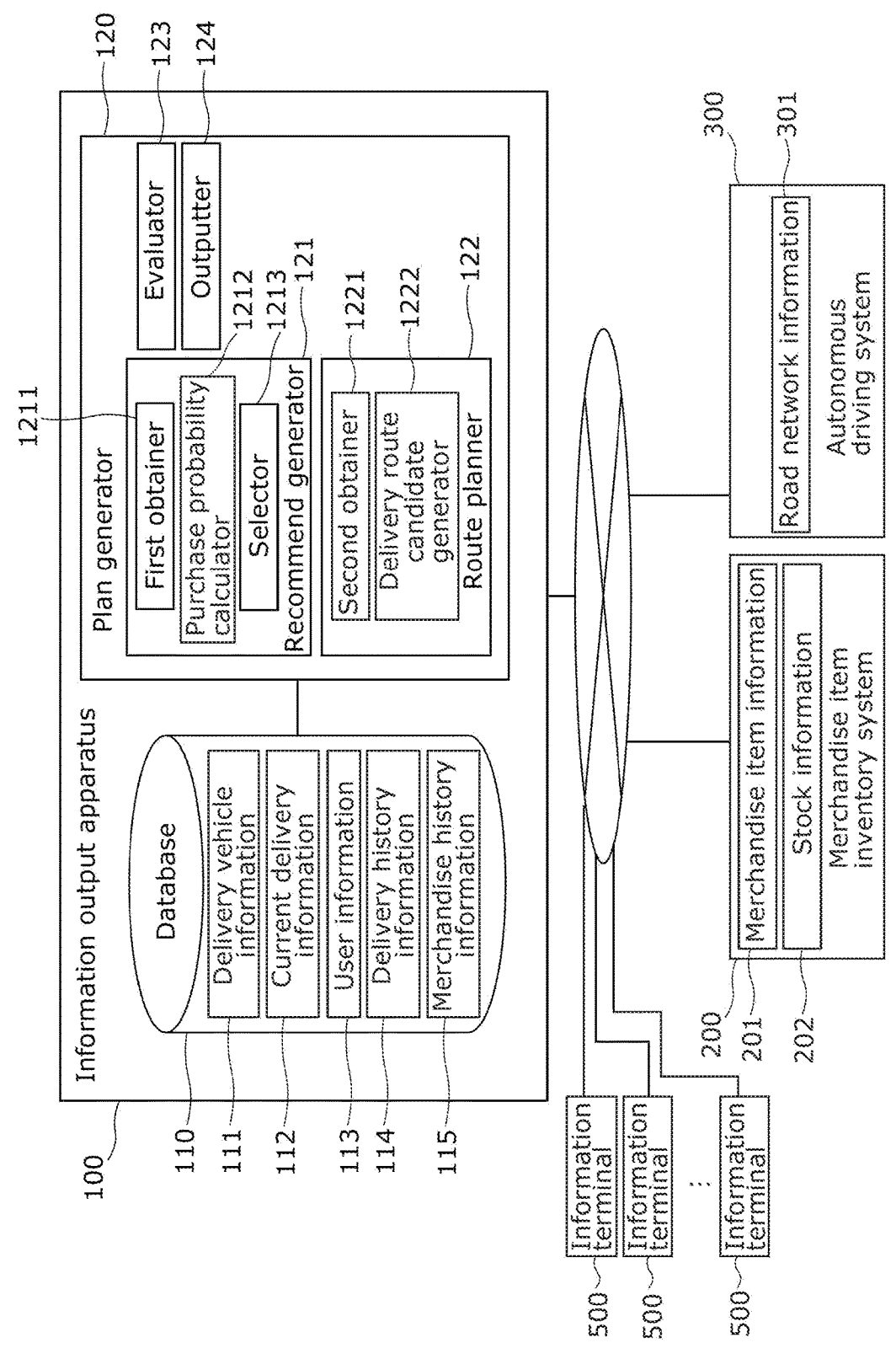
FIG. 9 is a block diagram illustrating the configuration of the information output apparatus according to Embodiment 2.

Next, Embodiment 2 will be described. In the description below, identical reference signs will be given to identical portions to those in Embodiment 1, and the description thereof will be omitted in some cases. In Embodiment 2, a case where the one or more candidate articles include a proposed article proposed by an article vendor will be described. FIG. 9 is a block diagram illustrating the configuration of information output apparatus 100 according to Embodiment 2.

Here, the article vendor refers to a dealer who treats a variety of articles, and includes a supplier and a wholesaler who sells articles to the supplier, for example. As illustrated in FIG. 9, information terminals 500 possessed by a plurality of article vendors are communicably connected to information output apparatus 100 according to Embodiment 2 via the Internet. Information terminal 500 includes a PC, a tablet terminal, a smartphone, and a feature phone, for example.

Information output apparatus 100 provides the user information of each of the users included in the determined delivery route to information terminal 500 of the supplier on or near the delivery route or the wholesaler doing business with the supplier. In information terminal apparatus 500, a proposed article that the user may purchase is selected based on a variety pieces of information included in the user information, and proposal information concerning the proposed article (such as article information, stock information, and the address of the supplier) is transmitted to information output apparatus 100. Information output apparatus 100 manages the proposed article as a candidate article based on the proposal information. This also enables product sales of the proposed article proposed by the article vendor in the autonomous driving vehicle. In other words, this enables product sales in the autonomous driving vehicle of a merchandise item (new commodity) which the article vendor wants to make the user aware of.

In the autonomous driving vehicle, the proposed article and the one or more candidate articles other than the proposed article may be loaded in different spaces.

Moreover, the information output method does not use the proposed article when candidate articles having high purchase probabilities can be restocked for the user of the delivery destination, and may use the proposed article when candidate articles having high purchase probabilities cannot be restocked for the user of the delivery destination.

Embodiment 3

Figure 10:
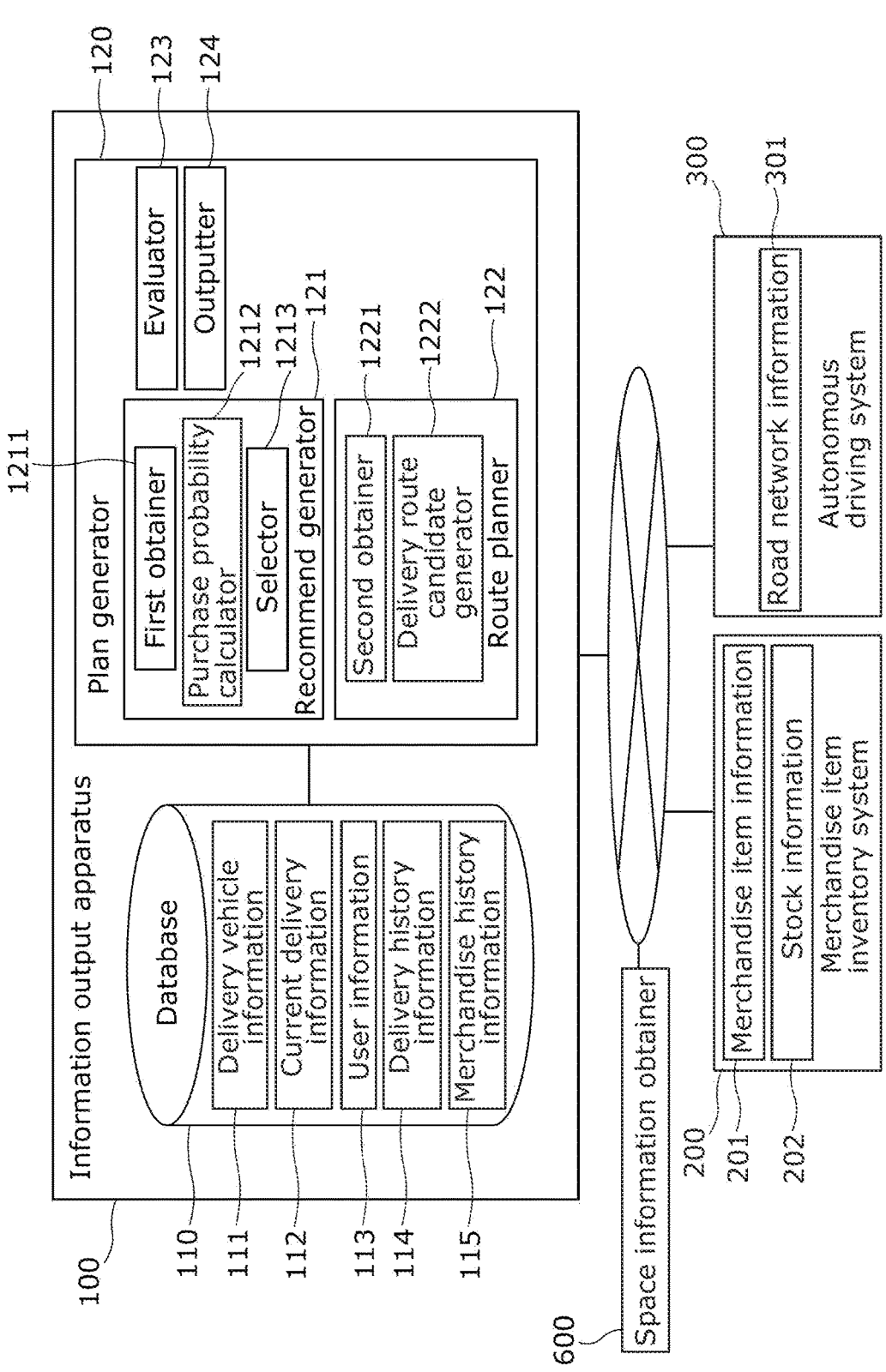
FIG. 10 is a block diagram illustrating the configuration of the information output apparatus according to Embodiment 3.

Next, Embodiment 3 will be described. In the description below, identical reference signs will be given to identical portions to those in Embodiment 1, and the description thereof will be omitted in some cases. For example, the vacant space of the autonomous driving vehicle tends to increase as the delivery is advancing. As the vacant space is larger, more candidate articles can be loaded onto the autonomous driving vehicle. In other words, more candidate articles can be proposed to the users afterward in the delivery route. In Embodiment 3, the case where the one or more candidate articles and the delivery route are updated in consideration of the situation of the vacant space of the autonomous driving vehicle will be described. FIG. 10 is a block diagram illustrating the configuration of information output apparatus 100 according to Embodiment 3.

As illustrated in FIG. 10, space information obtainer 600 included in the autonomous driving vehicle is communicably connected to information output apparatus 100. Space information obtainer 600 is a device that obtains the space information of the autonomous driving vehicle. The space information is information including the situation of the vacant space of the autonomous driving vehicle. Space information obtainer 600 includes a device including a camera that captures a video of the loading space of the autonomous driving vehicle and an analyzer that automatically obtains the situation of the vacant space by analyzing the video obtained from the camera. To be noted, space information obtainer 600 may include a camera which captures a video of the loading space of the autonomous driving vehicle, and may use the video captured by the camera as the space information. In this case, in information output apparatus 100A, the situation of the vacant space may be determined by an operator who visually observes the video as the space information.

Recommend generator 121 in information output apparatus 100 successively obtains the space information, and updates the one or more candidate articles for the users living at the delivery destinations afterward, based on this space information. At this time, the one or more candidate articles may be updated in consideration of only the users at the delivery destinations afterward. In addition, the one or more candidate articles may be updated in consideration of the purchase probability and the arrival tolerance time of the user.

Likewise, route planner 122 also successively obtains the space information, and plans the delivery route candidates afterward based on the space information and the updated candidate articles. Evaluator 123 evaluates delivery route candidates generated by delivery route candidate generator 1222, and determines one or more of the delivery route candidates having the highest result of evaluation as the delivery route to be actually traveled by the autonomous driving vehicle.

The contacts of the users (such as the telephone number and the mail address) may be registered in information output apparatus 100. After the one or more candidate articles are loaded in the vacant space, information output apparatus 100 may notify the contacts of the users for delivery afterward that the one or more candidate articles are loaded. Thereby, the user can consider purchase of the one or more candidate articles in advance.

Because a plurality of delivery articles are delivered to the same delivery destination, the amount of the one or more candidate articles to be loaded may be determined according to the number of vacant spaces after the delivery. Because the size of the loading space may be different among the autonomous driving vehicles in some cases, the one or more candidate articles may be determined according to the size of the vacant space after the delivery.

For example, for a predetermined candidate article, when a user with high purchase probability does not purchase the candidate article and other users thereafter have low purchase probability, it can be inferred that the predetermined candidate article remains unsold. When this inference is made, the one or more candidate articles and the delivery route may be updated such that the predetermined candidate article is replaced by a new candidate article with high purchase probability for other users. The place for replacement is a supplier who treats the new candidate article. In the replacement of the predetermined candidate article, the place where the predetermined candidate article is unloaded from the autonomous driving vehicle may be different from the place where the new candidate article is restocked. The place where the predetermined candidate article is unloaded may be the place where the predetermined candidate article is restocked, or may be a different place (such as a supplier of the same company located in a different place).

After finishing all the deliveries, the autonomous driving vehicle returns to delivery station H. Unsold candidate articles left in the autonomous driving vehicle will obstruct loading of delivery articles for the next delivery. For this reason, the delivery route may be determined in consideration of unloading of these unsold candidate articles from the autonomous driving vehicle. For example, the place where the unsold candidate articles are unloaded may be determined on a route returning from the last delivery destination of the delivery route to delivery station H. When the place where the unsold candidate articles are unloaded is not found on the route returning from the last delivery destination of the delivery route to delivery station H, the place where the unsold candidate articles are unloaded may be determined on a route from the delivery destination second to the last to the last delivery destination or a route from the delivery destination third to the last to the delivery destination second to the last. In other words, the place where the unsold candidate articles are unloaded may be determined on a route in a final stage of the delivery route. The route in the final stage of the delivery route refers to a route from the delivery destination n-th (where $2 \leq n$ m/2 and n is an integer) to the last to the delivery destination $(n-1)$-th to the last, assuming that the entire delivery route has m delivery destinations. Which place of the delivery destination from the last is selected as the place where a candidate article is unloaded may be determined according to the purchase probability of the candidate article calculated for the user of the delivery destination. For example, when it is determined that the purchase probability of the candidate article is low in both the last delivery destination and the delivery destination second to the last, it is determined that the candidate article is unloaded on the delivery route to the delivery destination of the third or higher place to the last.

There is a possibility that the candidate article is sold out in the last delivery destination. Assuming this case, in the information output method, it may be determined, based on the purchase probability of the candidate article in the last delivery destination, whether the candidate article is unloaded on the route from the delivery destination second to the last to the last delivery destination or whether the candidate article is not unloaded and delivered to the last delivery destination. When the candidate article is delivered to the last delivery destination and is unsold at the delivery destination, the place where the candidate article is unloaded may be determined outside the delivery route. In this case, whether the place is used may be determined according to the cost of travel to the place. Such determination processing is unnecessary when the candidate article can be unloaded in delivery station H.

As in Embodiment 2, when information terminals 500 possessed by a plurality of article vendors are communicably connected to information output apparatus 100 via the Internet, information terminals 500 may be notified based on the space information, to ask for proposed articles. For example, when the vacant space of the autonomous driving vehicle is increased during the delivery, effective use of the vacant space is desired. Specifically, when an increase in vacant space is known from the space information, information output apparatus 100 notifies information terminals 500 of the suppliers afterward on the delivery route, and asks for candidate articles. Thereby, these candidate articles can be loaded onto the autonomous driving vehicle in the suppliers which are asked.

The article vendors may register the proposed articles in advance. In this case, when an increase in vacant space is known from the space information and the supplier of the article vendor treating the registered proposed article is present on the delivery route, information output apparatus 100 may incorporate the supplier into the delivery route. The article vendor may register the supplier in advance. In this case, the proposed article is determined after the supplier is incorporated into the delivery route.

In the present embodiment, the description has been made using the autonomous driving vehicle delivering articles as one example of the moving body. However, an autonomous driving vehicle for mobile sales (hereinafter, referred to a mobile sales vehicle) may be set as the moving body. In this case, when an increase in vacant space is known from the space information of the mobile sales vehicle and a user who requests delivery is present on a route to the next travel destination (such as the next place for sales or the next base), information output apparatus 100 may cause articles to be delivered to the user. In this case, when the delivery destination and the origin of delivery are on the same route (close on the route), the request for delivery of articles may be accepted.

Because how much the vacant space is increased during traveling cannot be grasped in advance, the size of the vacant space may be determined according to the situation of sales in the travel destination, and based on the result of determination, the conditions (such as the kind, the size, and the number) of the articles that can be delivered may be determined.

It is also assumed that the mobile sales vehicle goes to a warehouse during traveling to replenish merchandise items. Whether the request for delivery of articles is accepted may be determined in consideration of this replenishment. The warehouse includes not only fixed facilities but also mobile warehouses (such as tracks). The delivery route may be planned in consideration of the place for replenishment where a mobile warehouse and a mobile sales vehicle meet.

Embodiment 4

Next, Embodiment 4 will be described. In the description below, identical reference signs will be given to identical portions to those in Embodiment 1, and the description thereof will be omitted in some cases. In Embodiment 1, the case where the delivery route for one autonomous driving vehicle is determined has been illustrated. In Embodiment 4, the case where delivery routes for a plurality of autonomous driving vehicles are determined will be described.

Initially, in information output apparatus 100, assignment of deliveries to autonomous driving vehicles is determined after requests of deliveries to be delivered in a predetermined period (e.g., one day) are collected. Thereby, current delivery information 112 is created for each of the autonomous driving vehicles. In information output apparatus 100, space availability information concerning the space availability of each of the autonomous driving vehicles for the candidate articles is obtained based on current delivery information 112 of the autonomous driving vehicle. The space availability for candidate articles is an index indicating how much space for candidate articles can be ensured in each of the autonomous driving vehicles. It can also be said that the space availability of the autonomous driving vehicle is an index indicating information of how soon another delivery should be performed after the current delivery.

Because the main role of the autonomous driving vehicle is delivery, first, the space for delivery need to be ensured.

In other words, it can also be said that the space for candidate articles is an excess space. For example, assume that each of the autonomous driving vehicles includes three article storage spaces in total. A high level of space availability corresponds to two spaces for candidate articles, a middle level of space availability corresponds to one space for candidate articles, and a low level of space availability corresponds to zero space for candidate articles.

In information output apparatus 100, the delivery route of each of the autonomous driving vehicles is determined based on the space availability information of the autonomous driving vehicle. At this time, because an autonomous driving vehicle with a higher space availability has a larger space for candidate articles, a delivery route with a bigger load of candidate articles is determined. Because an autonomous driving vehicle with a low level of space availability has zero space for candidate articles, a delivery route without restocking candidate articles is determined.

The number of times to restock candidate articles (the number of times to go to suppliers) may be limited to according to the space availability of the autonomous driving vehicle. For example, when the autonomous driving vehicle includes three article storage spaces in total, the autonomous driving vehicle goes to three delivery destinations, and thus has at least two chances to restock candidate articles. At this time, the number of times to restock can be set to two times for an autonomous driving vehicle with a high level of space availability, and can be set to one time for an autonomous driving vehicle with a middle level of space availability.

Here, a demand for delivery is varied depending on the time zone. For this reason, when information output apparatus 100 can predict the space availability of the autonomous driving vehicle in advance, information output apparatus 100 may adjust the space for candidate articles based on the predicted space availability. Because the space availability of each of the autonomous driving vehicles is varied from hour to hour, the space for candidate articles may be adjusted according to the varied space availability.

Because the delivery efficiency does not drop at a high level of space availability of the autonomous driving vehicle even if it makes a detour to restock candidate articles, a delivery route with a wider area to restock may be determined, compared to the case at a low level of space availability.

The space for candidate articles may be adjusted according to the busyness level of delivery. The busyness level of delivery can be determined, for example, by the requests for delivery and the number of autonomous driving vehicles which can treat the requests.

(Others)

The information output method according to the embodiments of the present disclosure have been described as above, but the embodiments above should not be construed as limitations to the present disclosure. In other words, all of the embodiments disclosed this time are exemplary in all respects, but not limitative. The scope of the present disclosure is defined by CLAIMS, and is intended to cover all of meanings equivalent to CLAIMS and all of changes within the scope.

For example, when the delivery destination of one moving body and that of the other moving body are the same delivery destination, the information output method may update the delivery routes of the one moving body and the other moving body to cause only the one moving body to travel to the same delivery destination. Specifically, after the delivery route of the one moving body is determined, and the delivery route of the other moving body is determined, the evaluator checks these delivery routes to determine whether the delivery destinations are the same delivery destination. When the delivery destinations are the same delivery destination, the delivery route candidate generator creates a plurality of delivery route candidates of the one moving body and a plurality of delivery route candidates of the other moving body to cause the one moving body to travel to the same delivery destination. Subsequently, the evaluator determines the delivery route of the one moving body and that of the other moving body by evaluating the delivery route candidates.

According to this, when the delivery destination of the one moving body and that of the other moving body are the same delivery destination, the delivery route of the one moving body and that of the other moving body are updated, and only the one moving body is caused to travel to the same delivery destination. For this reason, it can be configured that only the one moving body delivers to the same delivery destination while the other moving body does not deliver there. Accordingly, the delivery routes of a plurality of moving bodies can be more efficient.

Moreover, when the supplier of the one moving body and that of the other moving body are the same supplier, the information output method may update the delivery route of the one moving body and that of the other moving body to cause only the one moving body to travel to the same supplier and briefly meet the other moving body after traveling to the same supplier. Specifically, after the delivery route of the one moving body is determined and then that of the other moving body is determined, the evaluator checks these delivery routes to determine whether the suppliers are the same supplier. When the suppliers are the same supplier, the delivery route candidate generator creates a plurality of delivery route candidates of the one moving body and a plurality of delivery route candidates of the other moving body to cause only the one moving body to travel and briefly meet the other moving body after traveling to the same supplier. Subsequently, the evaluator determines the delivery route of the one moving body and that of the other moving body by evaluating the delivery route candidates.

According to this, when the supplier of the one moving body and that of the other moving body are the same supplier, the delivery route of the one moving body and that of the other moving body are updated, and only the one moving body is caused to travel to the same supplier and briefly meet the other moving body after traveling to the same supplier. For this reason, after the one moving body collectively restocks candidate articles from the supplier, the one moving body can pass the candidate articles to the other moving body at the meeting place. Accordingly, the delivery routes of a plurality of moving bodies can be made more efficient.

Moreover, the information output method may obtain change information including a change in situation on the delivery route, and may update the delivery route based on the change information. Specifically, after the second obtainer obtains the change information, the delivery route candidate generator creates a plurality of delivery route candidates based on the situation change information. Subsequently, the evaluator determines the delivery route of the moving body by evaluating the delivery route candidates. Here, the change information includes information concerning an increase or decrease in delivery destination due to cancelling or addition of deliveries, information concerning a change in stock of candidate articles in the supplier, information concerning a change in traffic restriction information or traffic jam information included in road network information 301, information concerning the absence of the user of the delivery destination, and information concerning a change in desired date and time of delivery.

According to this, because the delivery route is updated based on the change information when the situation changes on the delivery route, a delivery route suitable for the change in situation can be created.

In the embodiments described above, the case where the one or more candidate articles which the user may purchase are selected based on the purchase probability has been illustrated. However, besides the purchase probability, the one or more candidate articles may be selected in consideration of prices of merchandise items, the degree of priority of the user, the degree of priority of articles, or earliness of the delivery period that the user wishes. For example, in the case of the prices of merchandise items, merchandise items with higher prices are preferentially considered. In the case of the degree of priority of the user, users paying higher contract fees are preferentially considered. In the case of the degree of priority of articles, suppliers paying higher contract fees are preferentially considered.

Moreover, when the delivery destination of the one moving body and that of the other moving body are the same delivery destination, the information output method executed by the information output apparatus may cause the one moving body and the other moving body to sell different candidate articles at the same delivery destination. This avoids recommendation of the same candidate articles at the same delivery destination.

Moreover, the information output method executed by the information output apparatus may output information to the user with extremely high (e.g., 90% or more) purchase probability such that a larger storage space of the candidate articles is provided in the autonomous driving vehicle.

Although the autonomous driving vehicle has been illustrated as the moving body in the embodiments above, the moving body may be a vehicle driven by a driver, a motorcycle, or a bicycle. In this case, the outputter may output the delivery route to the display terminals provided in these vehicles, motorcycles, and bicycles, or may output the delivery route to the mobile terminal possessed by the driver.

Although the aspects of the information output apparatus have been described based on the embodiments and the like as above, the aspects of the information output apparatus are not limited to the embodiments and the like. The embodiments and the like may be subjected to modifications conceived by persons skilled in the art, or a plurality of components in the embodiments and like may be optionally combined. For example, the processing executed by a specific component in the embodiments and the like may be executed by another component instead of the specific component. Moreover, the order of processings may be changed, or processings may be executed in parallel.

Moreover, the information output method including the steps performed by the components in the information output apparatus may be executed by any apparatus or system. In other words, this information output method may be executed by the information output apparatus, or may be executed by another apparatus or system.

For example, the information output method may be executed by a computer provided with a processor, a memory, and an input/output circuit. At this time, the information output method may be executed by execution of a program for causing the computer to execute the information output method. Additionally, the program may be recorded on a non-transitory computer-readable recording medium.

The components in the information output apparatus may be configured of dedicated hardware, may be configured of general-purpose hardware that executes the above program, or may be configured of a combination thereof. The general-purpose hardware may be configured of a memory that stores programs, a general-purpose processor that reads out the programs from the memory and executes the programs, and the like. Here, the memory may be a semiconductor memory, a hard disk, or the like, and the general-purpose processor may be a CPU or the like.

The dedicated hardware may be configured of a memory, dedicated processor, and the like. For example, the dedicated processor may refer to the memory, and execute the information processing method described above.

The components in the information output apparatus may be electric circuits. These electric circuits may form one electric circuit as a whole, or may be individual electric circuits. These electric circuits may correspond to dedicated hardware, or may correspond to the general-purpose hardware which executes the programs above.

INDUSTRIAL APPLICABILITY

The present disclosure is applicable to information output methods and the like which create and output the delivery route of a moving body.

The invention claimed is:

1. An information output method for use in an information output apparatus, the information output method comprising:

obtaining delivery destination information concerning at least one delivery destination to which an article is delivered by an autonomous vehicle;

obtaining merchandise history information concerning a sales history of items sold to a user living at the at least one delivery destination;

calculating, for each of a plurality of merchandise items that the user may purchase, purchase probability information based on the merchandise history information, the purchase probability information indicating purchase probability that the user will purchase the merchandise item;

selecting one or more candidate articles included in the plurality of merchandise items, based on the purchase probability information;

obtaining supplier information concerning suppliers of the one or more candidate articles;

generating, based on the delivery destination information and the supplier information, delivery route candidates which are routes along which the article is delivered by the autonomous vehicle and along which the one or more candidate articles are loaded onto the autonomous vehicle;

evaluating each of the delivery route candidates based on at least two criteria from among (i) a traveling time taken for the autonomous vehicle to travel along the delivery route candidate, (ii) a traveling distance of the delivery route candidate for the autonomous vehicle to travel, and (iii) the purchase probability information, each of the at least two criteria having weights that are adjusted based on an importance of the criteria to the evaluating;

determining one or more of the delivery route candidates
  having a result of evaluation satisfying a predetermined
  condition as a delivery route to be traveled by the
  autonomous vehicle; and
outputting the delivery route to the autonomous vehicle to
  cause the autonomous vehicle to travel the outputted
  delivery route.
2. The information output method according to claim 1,
wherein the purchase probability information is calcu-
  lated using a model trained based on the merchandise
  history information, delivery history information con-
  cerning a delivery history of the user living at the at
  least one delivery destination, and user information
  concerning the user.
3. The information output method according to claim 2,
wherein the model is retrained when a predetermined
  update condition is satisfied.
4. The information output method according to claim 1,
wherein users living at delivery destinations are formed
  into groups, and the one or more candidate articles are
  selected for each of the groups based on the purchase
  probability information calculated for the correspond-
  ing one of the groups, the delivery destinations being
  the at least one delivery destination.
5. The information output method according to claim 1,
wherein in the selecting of the one or more candidate
  articles, one or more candidate articles included in a
  predetermined number of top-ranking positions of the
  purchase probability indicated in the purchase prob-
  ability information are selected among a plurality of
  candidate articles.
6. The information output method according to claim 1,
wherein in the evaluating of each of the delivery route
  candidates, a delivery route candidate having a higher
  purchase probability is ranked in a higher position, the
  purchase probability being included in the purchase
  probability information.
7. The information output method according to claim 1,
wherein the one or more candidate articles include a
  proposed article proposed by an article vendor based on
  user information of the user.
8. The information output method according to claim 1,
wherein in the evaluating of each of the delivery route
  candidates, a delivery route candidate having a shorter
  traveling time is ranked in a higher position.
9. The information output method according to claim 1,
wherein in the evaluating of each of the delivery route
  candidates, a delivery route candidate having a shorter
  traveling distance is ranked in a higher position.
10. The information output method according to claim 1,
wherein information promoting purchase of the one or
  more candidate articles loaded onto the autonomous
  vehicle is output.
11. The information output method according to claim 1,
wherein when a delivery destination of one autonomous
  vehicle and a delivery destination of an other autono-
  mous vehicle are a same delivery destination, a deliv-
  ery route of the one autonomous vehicle and a delivery
  route of the other autonomous vehicle are updated to
  cause only the one autonomous vehicle to travel to the
  same delivery destination, the same delivery destina-
  tion being included in the at least one delivery desti-
  nation.
12. The information output method according to claim 1,
wherein when a supplier of one autonomous vehicle and
  a supplier of an other autonomous vehicle are a same
  supplier, a delivery route of the one autonomous vehicle and a delivery route of the other autonomous
  vehicle are updated to cause only the one autonomous
  vehicle to travel to the same supplier and briefly meet
  the other autonomous vehicle after traveling to the
  same supplier, the same supplier being included in the
  suppliers.
13. The information output method according to claim 1,
comprising:
  obtaining change information including a change in situ-
    ation in the delivery route; and
  updating the delivery route based on the change informa-
    tion.
14. The information output method according to claim 1,
comprising:
  obtaining space information concerning a situation of a
    vacant space of the autonomous vehicle; and
  updating the one or more candidate articles and the
    delivery route based on the space information.
15. The information output method according to claim 1,
comprising:
  obtaining space availability information concerning space
    availability in a plurality of autonomous vehicles for
    the one or more candidate articles, the plurality of
    autonomous vehicles each being the autonomous
    vehicle; and
  adjusting a space for the one or more candidate articles of
    each of the plurality of autonomous vehicles based on
    the space availability information of the autonomous
    vehicle.
16. An information output apparatus comprising:
  a delivery destination information obtainer that obtains
    delivery destination information concerning at least
    one delivery destination to which an article is delivered
    by an autonomous vehicle;
  a merchandise history information obtainer that obtains
    merchandise history information concerning a sales
    history of items sold to a user living at the at least one
    delivery destination;
  a purchase probability calculator that calculates, for each
    of a plurality of merchandise items that the user may
    purchase, purchase probability information based on
    the merchandise history information, the purchase
    probability information indicating purchase probability
    that the user will purchase the merchandise item;
  a selector that selects one or more candidate articles
    included in the plurality of merchandise items that the
    user may purchase, based on the purchase probability
    information;
  a supplier information obtainer that obtains supplier infor-
    mation concerning suppliers of the one or more candi-
    date articles;
  a delivery route candidate generator that generates, based
    on the delivery destination information and the supplier
    information, delivery route candidates which are routes
    along which the article is delivered by the autonomous
    vehicle and along which the one or more candidate
    articles are loaded onto the autonomous vehicle;
  an evaluator that (A) evaluates each of the delivery route
    candidates based on at least two criteria from among (i)
    a traveling time taken for the autonomous vehicle to
    travel along the delivery route candidate, (ii) a traveling
    distance of the delivery route candidate for the autono-
    mous vehicle to travel, and (iii) the purchase probabil-
    ity information, each of the at least two criteria having
    weights that are adjusted based on an importance of the
    criteria to the evaluation, and (B) determines one or
    more of the delivery route candidates having a result of evaluation satisfying a predetermined condition as a delivery route to be traveled by the autonomous vehicle; and an outputter that outputs the delivery route to the autonomous vehicle to cause the autonomous vehicle to travel the outputted delivery route.

17. A non-transitory computer-readable recording medium having recorded thereon a program for causing a computer to execute the information output method according to claim 1.

* * * * *